(12) United States Patent
Kohlndorfer et al.

(10) Patent No.: US 6,749,150 B2
(45) Date of Patent: Jun. 15, 2004

(54) ROLLER WEB GUIDE (OR D-RING) SEAT BELT SYSTEM

(75) Inventors: Kenneth H. Kohlndorfer, Roseville, MI (US); Lawrence M. Refior, Romeo, MI (US); Michael J. Moore, Attica, MI (US); Richard W. Koning, Yale, MI (US); Wendell C. Lane, Jr., Romeo, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/003,489

(22) Filed: Nov. 1, 2001

(65) Prior Publication Data

US 2003/0080239 A1 May 1, 2003

(51) Int. Cl.$^7$ .................. B60R 22/00; B65H 23/26
(52) U.S. Cl. .............. 242/615.2; 242/377; 280/808; 297/473
(58) Field of Search ............... 242/615.2, 377; 297/473; 280/808

(56) References Cited

U.S. PATENT DOCUMENTS

| | | | | |
|---|---|---|---|---|
| 4,369,931 A | * | 1/1983 | Fohl | 242/377 |
| 4,494,774 A | * | 1/1985 | Fohl | 280/806 |
| 4,642,853 A | * | 2/1987 | Plesniarski et al. | 24/163 R |
| 4,993,746 A | | 2/1991 | Hagelthron | |
| 5,415,433 A | * | 5/1995 | Pfeiffer | 280/808 |
| 5,673,936 A | * | 10/1997 | Mondel | 280/808 |
| 5,775,732 A | * | 7/1998 | Grau | 280/808 |
| 5,984,358 A | * | 11/1999 | Mar et al. | 280/808 |
| 6,113,146 A | | 9/2000 | Mautsch et al. | 280/808 |
| 6,138,328 A | | 10/2000 | Iseki | |
| 6,170,876 B1 | | 1/2001 | Mautsch et al. | |
| 6,217,070 B1 | * | 4/2001 | Kopetzky et al. | 280/808 |
| 6,250,684 B1 | * | 6/2001 | Gleason et al. | 280/808 |
| 6,267,410 B1 | * | 7/2001 | Koketsu et al. | 280/801.1 |
| 6,290,259 B1 | * | 9/2001 | Drobot et al. | 280/808 |
| 6,324,730 B1 | * | 12/2001 | Iseki | 24/197 |
| 6,439,609 B1 | * | 8/2002 | Smithson | 280/801.1 |

FOREIGN PATENT DOCUMENTS

| | | |
|---|---|---|
| DE | 195 31 603 A1 | 3/1997 |
| DE | 197 57 171 A1 | 12/1998 |
| DE | 199 13 423 C1 | 5/2000 |
| EP | 0 726 187 B1 | 5/1998 |
| EP | 0 842 830 A1 | 5/1998 |
| EP | 0 749 874 B1 | 9/1998 |
| EP | 0 890 490 A1 | 1/1999 |
| JP | 2000062568 | 2/2000 |

* cited by examiner

Primary Examiner—Kathy Matecki
Assistant Examiner—Sang Kim
(74) Attorney, Agent, or Firm—Markell Seitzman

(57) ABSTRACT

A safety system including a web guide comprising: a load-bearing member; a roller rotationally supported in relation to the load-bearing member; a one-way clutch for permitting the roller to rotate in a first direction and for prohibiting the roller from rotating in an opposite second direction.

16 Claims, 7 Drawing Sheets

ROLLER WEB GUIDE (OR D-RING) SEAT BELT SYSTEM

BACKGROUND AND SUMMARY OF THE INVENTION

The present invention generally relates to safety restraint systems and more particularly to an improved web guide or D-ring. The typical three-point seat belt system 10 as shown in FIG. 1 comprises a retractor 22 (mounted in the seat or on a vehicle pillar), a seat belt 24, a web guide (also referred in the art as a web guide) 26 (often mounted on the B or C-pillar), a tongue 28 and a seat belt buckle 30 (mounted to a seat frame or to the floor). The web guide 26 is shown in FIG. 2. A web guide such as 26 generally includes a load-bearing plate or wire form 40 with a fastener-receiving opening 42 and a thin seat belt opening or slot 44. That portion of the plate or wire 40 below opening 44 defines a belt-receiving surface 46 upon which the seat belt slides. The seat belt 24 slides upon surface 46 as the belt protracts and retracts from and to the retractor. The friction in the seat belt system defines in part the spring constant of the rewind spring that acts on the spool of the retractor and which must generate a spring force sufficiently high to overcome friction in the system and pull or rewind a determinable extended length of seat belt (also referred to as webbing). As can be appreciated, the restoring force of the spring is proportional with the spring constant and as the spring constant increases (with increasing system friction) the inherent force applied by the shoulder belt upon the occupant's shoulder increases. Many occupants find that a high level of belt force on the shoulder is objectionable.

In order to reduce one parameter contributing to the total system friction, the prior art has proposed to replace the static surface 46 of the web guide 26 with a roller 50 that is shown in FIG. 3. The roller is rotationally secured via, for example, an axle (or two stub axles) 52 to opposite sides 54 of the web guide about opening 44. As can be appreciated the webbing support surface previously provided by 46 is now provided by the outer diameter of the roller. One of the benefits of using a roller, as mentioned above, is the reduced friction in the system as sliding friction is replaced by rolling friction.

Reference is made to FIG. 4, which is a plan view showing the seat belt system 10 in a condition used by an occupant 60, seated upon a seat 62. As can be seen, the tongue 28 is locked within the buckle 30. In this orientation, the web guide 26 will generally rotate about its pivot point (fastener) toward the front of the vehicle. This orientation is further shown in FIG. 4a. FIG. 4 also shows the resultant force vector F acting on the webbing as it extends across the web guide 26 and is urged downwardly by the rewind force of the spring. As expected, the use of the roller 50 reduces the level of friction generated by or acting on the seat belt. Because of this reduced friction force however, in concert with the downwardly directed force F, the seat belt is encouraged to slide sideways on the roller into the rearward (downwardly) side (or end) (see numeral 64) of opening 44. Depending on the forces involved, the seat belt can become jammed between the plate 40 and the roller 50. Additionally, as the occupant pulls the tongue from its stowed position, as the tongue is inserted in the buckle the geometry of the generated forces increases the tendency of belt jamming when a bi-directional roller is used in the web guide.

The propensity for the seat belt to slide toward the end of slot 44 increases as the roller rotates, which occurs on buckling-up and may occur during other times when the belt is worn such as when the occupant moves forward and rearward. Also, as the angle of the web guide increases, it becomes easier for the webbing to get stuck (which in the art is called roping or dumping) within the spaces near the rear edge 64 about the roller. When an occupant releases the tongue from the buckle, the webbing will quickly assume the orientation as shown in FIG. 1 in which the seat belt segments on either side of the slot 44 (or roller) are generally in a parallel condition.

It is an object of the present invention to provide a seat belt web guide having an improved performance characteristic.

A further object of the present invention is to provide a web guide that utilizes a roller but one that rotates only when the webbing is retracting and one that when incorporated into a safety system makes the safety system more comfortable to use.

Accordingly the invention comprises a safety system including a web guide comprising: a frame; a roller rotationally supported in relation to the frame; and a one-way clutch for permitting the roller to rotate in a first direction and for prohibiting the roller from rotating in an opposite second direction. The roller will generally be sufficiently wide to support the width of a seat belt (webbing). The exterior surface of the roller can be flat or crowned.

Many other objects and purposes of the invention will be clear from the following detailed description of the drawings.

DETAILED DESCRIPTION OF THE DRAWINGS

Figure 5A:
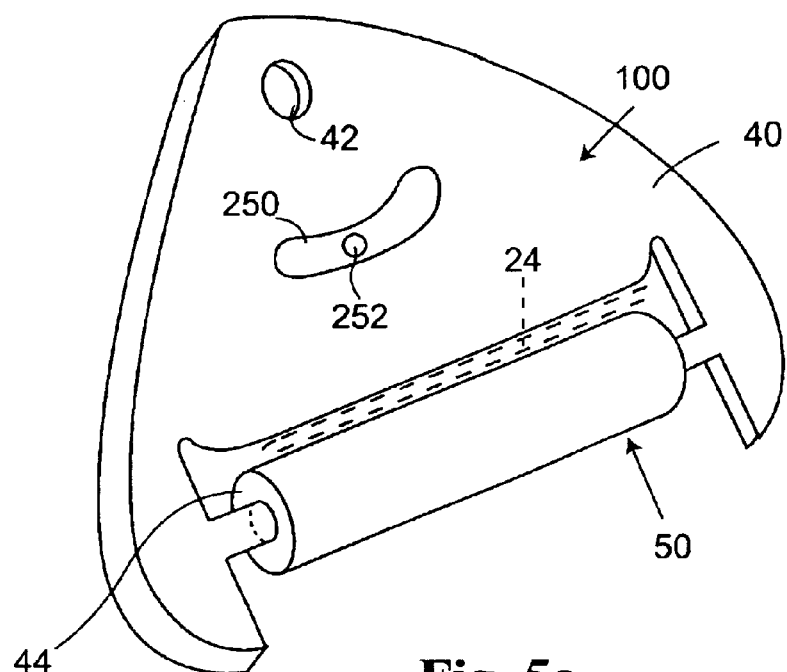
FIG. 5a is an isometric view of a web guide in accordance with the present invention.
Figure 5B:
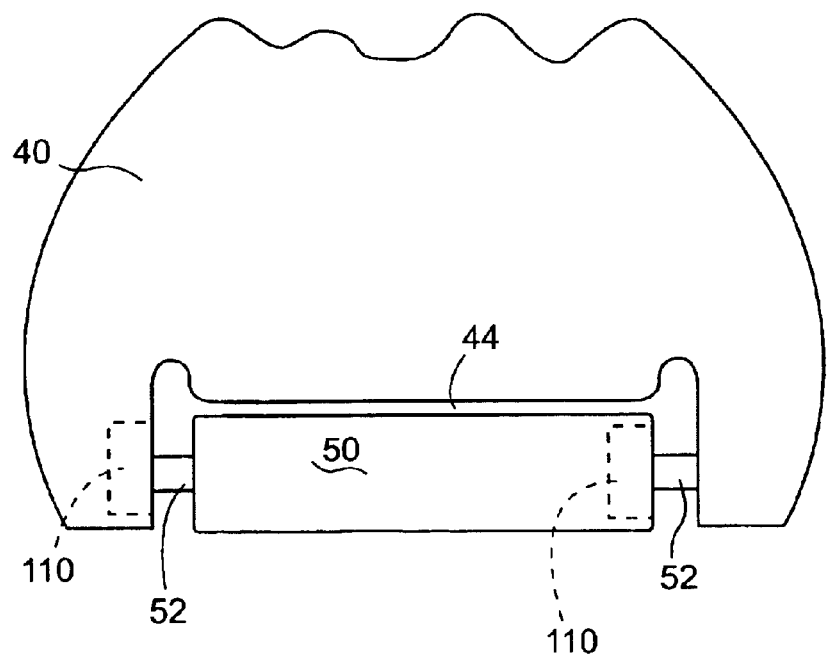
FIG. 5b is a plan view of a web guide made in accordance with the present invention.

Reference is briefly to FIGS. 5a and 5b, which illustrate major components of the present invention. The web guide 100 utilizes much of the componentry of a conventional web guide in that it includes a plate 40 or a wire form, a slot 44 (in most of the embodiments) and a roller 50. The roller 50 is rotationally supported within the plate 40. Additionally, the web guide 100 includes a one-way clutching mechanism 110 that can be located within the roller 50 or on the plate 40 or some combination thereof. This clutching mechanism is designed to prohibit the roller 50 from rolling when the seat belt 24 is extracted from the retractor but permits the roller 50 to rotate when the seat belt is being retracted onto the spool of the retractor.

Figure 6A:
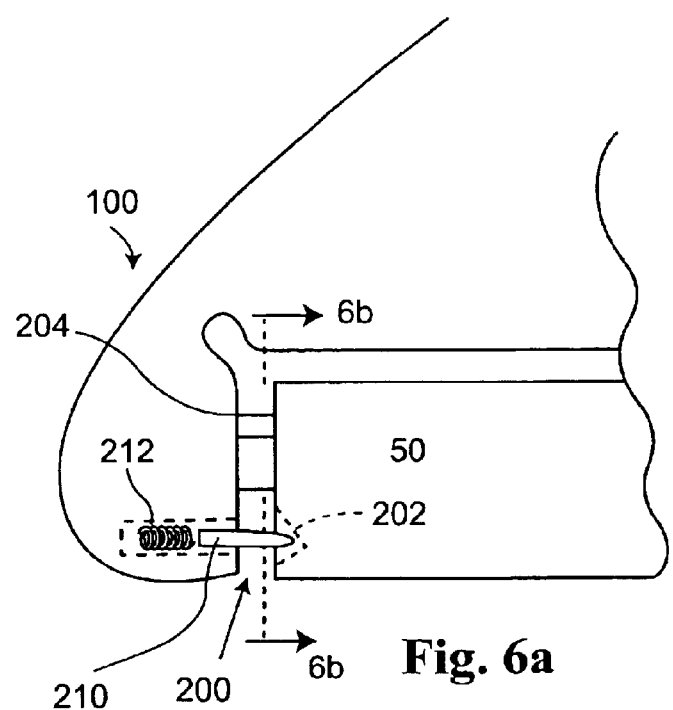
FIG. 6a is a partial cross-sectional view of a web guide having a one-way clutch mechanism.
Figure 6B:
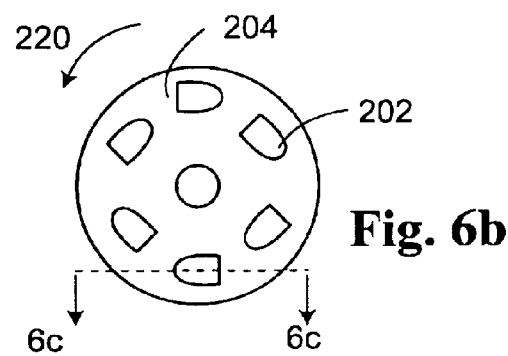
FIGS. 6b is a plan view of an end of a roller (an inter-locking pin is not included)
Figure 6C:
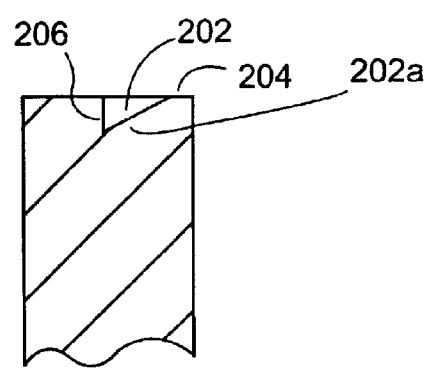
FIG. 6c is a partial cross-sectional view taken through section 6c—6c of FIG. 6b.

Reference is briefly made to FIGS. 6a–6c. FIG. 6a shows an improved web guide 100 with a roller 50 and a one-way clutching mechanism 200. The one-way clutching mechanism 200 includes a plurality of tapered slots 202 on a face 204 of roller 50. FIG. 6c shows the shape of one of the tapered slots 202 (all of which are identical). The taper is linear (and can be arcuate) beginning at the face 204 and ending at a sharp step or shoulder 206. As can be seen from FIG. 6a, a pin 210 is biased by a spring 212 toward the face of the roller and in particular into a particular one of the grooves 202. As the roller rotates in a counterclockwise direction (see arrow 220) which for example corresponds to the direction of belt retraction, the pin rides up the taper 202a onto the face 204 of the roller 50 and then drops into the next adjacent slot 202, thereby permitting the roller 50 to rotate as the belt rewinds. When the seat belt is extracted the friction between the seat belt and the roller will urge the roller to rotate oppositely. However, the one-way clutch prevents this rotation, as the tip of the pin 210 will be forced against the shoulder 206, preventing the rotation of the roller 50.

Figure 7:
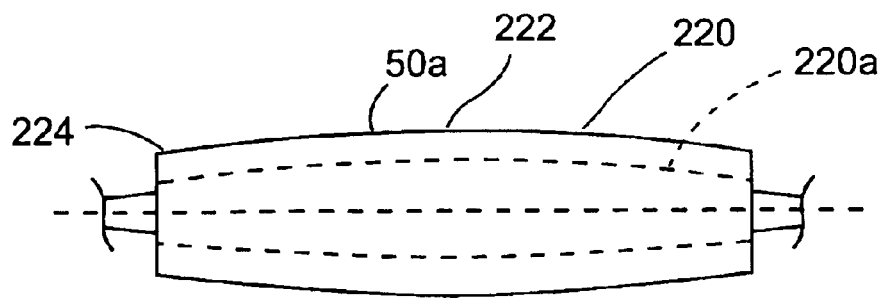
FIG. 7 shows an alternate construction of a roller mechanism.

Reference is briefly made to FIG. 7, which illustrates an alternate roller 50a. The roller 50a is substantially identical to roller 50 shown earlier, however, the exterior surface 220 of roller 50a is crowned, that is, it has a high point 222 and its outside surface extends smoothly from the high point 222 to the ends 224 of the roller. The crowned surface will tend to interact with the seat belt 24 and cause the seat belt to remain centered (self-centered) on the round roller 50a. The exterior surface can be curved or conical (see phantom line 220a).

Figure 1:
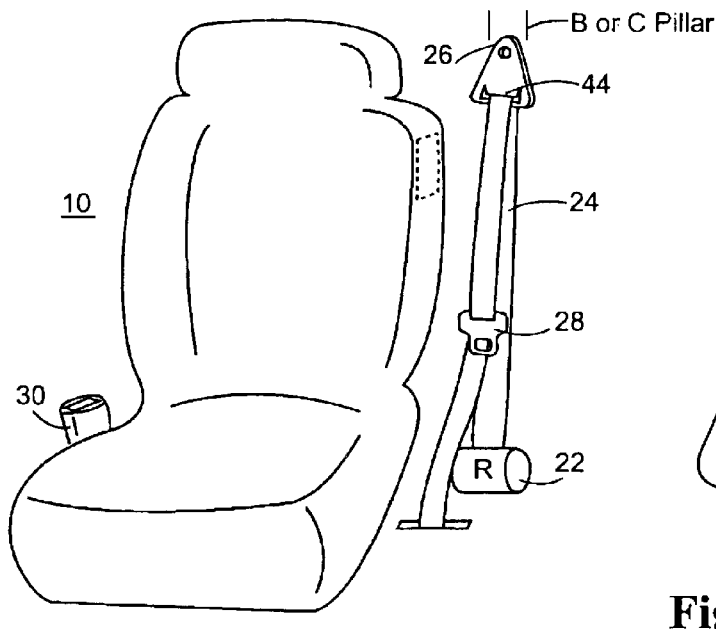
FIG. 1 shows a three-point seat belt with the belt and tongue in a stowed position.
Figure 2:
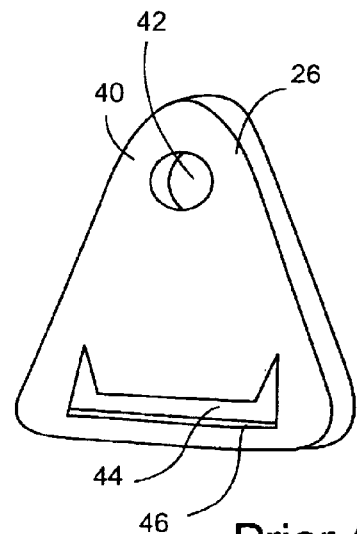
FIG. 2 illustrates a prior art web guide.
Figure 4A:
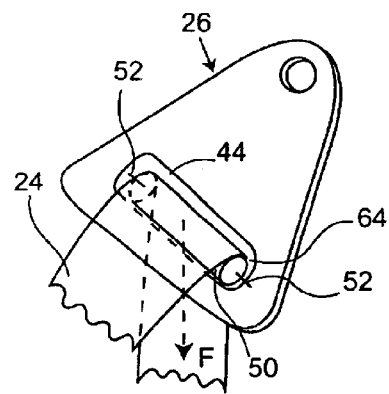
FIG. 4a is an enlarged view of the web guide of FIG. 4.
Figure 3:
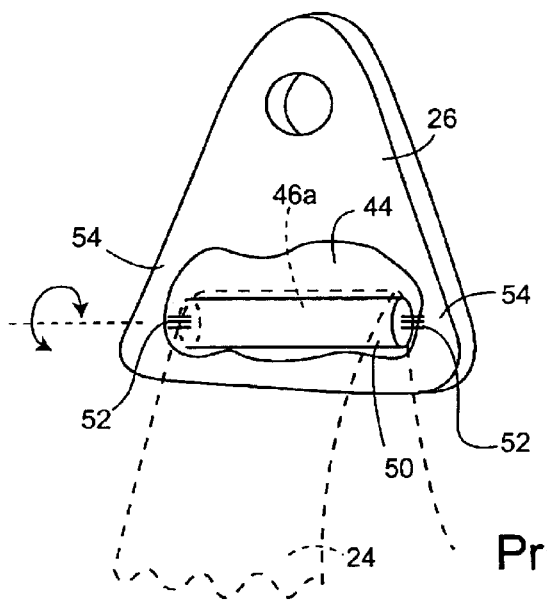
FIG. 3 illustrates a web guide with a roller.
Figure 4:
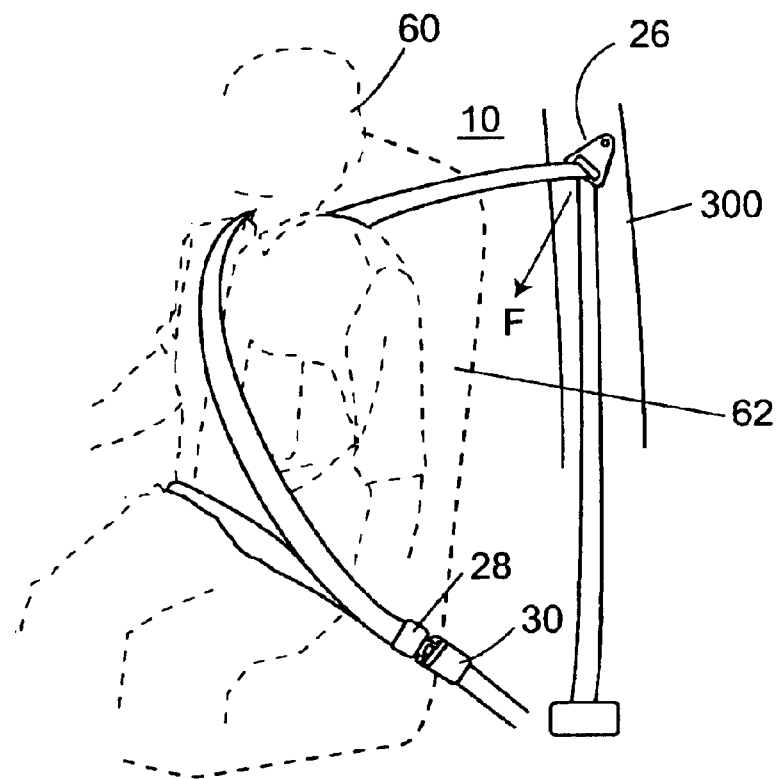
FIG. 4 is a plan view showing a seat belt system in a locked condition, positioned about an occupant.
Figure 8A:
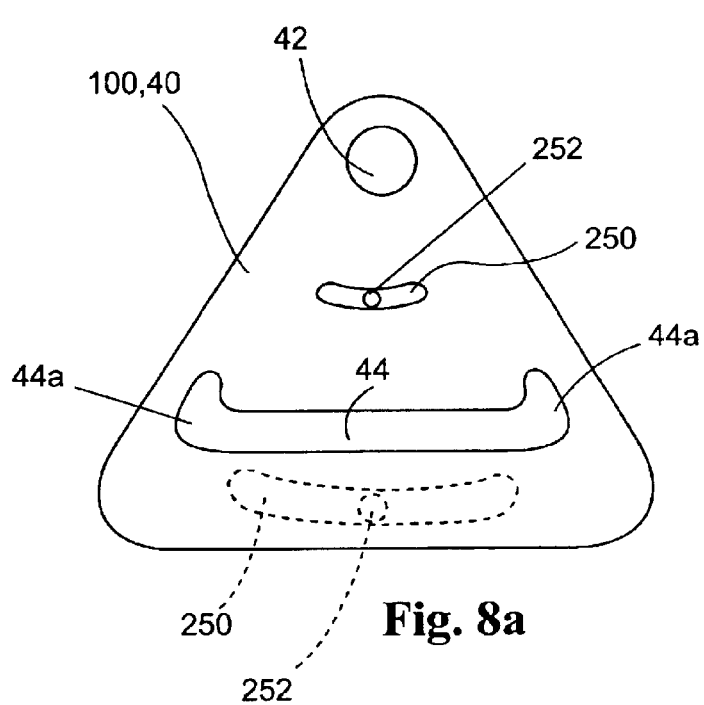
FIGS. 8a–8d show two alternate web guides.
Figure 8B:
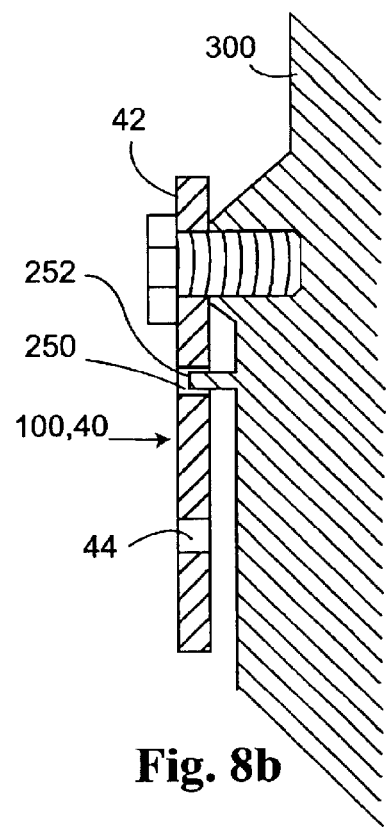

FIGS. 8a and 8b show an alternate embodiment of a web guide 26 having a mounting opening 42 and web-receiving slot 44. As illustrated, the slot 44 includes an upward curved end 44a on either side. The web guide includes an additional slot 250, which as illustrated is positioned between opening 42 and slot 44. Extending through slot 250 is a pin 252 that extends from the mounting surface 300 upon which the web guide 26 is mounted. Slot 250 (and pin 252) can also be positioned, for example, below slot 44 and this is shown in the phantom line 250. This mounting surface can be one of the pillars of the vehicle or a support frame of a seat or alternatively a height adjusting mechanism (in particular the carriage of the height adjusting mechanism). As will be seen, this construction can be incorporated within a conventional web guide or within a roller web guide of the present invention as shown in FIG. 5a. The benefit of this construction can be appreciated by returning briefly to FIG. 4a. If a web guide is rotated to an exaggerated angle the tendency of the seat belt to slide to the end of the slot 44 increases. The pin and slot construction limits the maximum rotational capability of the web guide 26. A rotation of the web guide oppositely will also be limited by the opposing end of slot 250 and its interaction with pin 252.

Figure 8C:
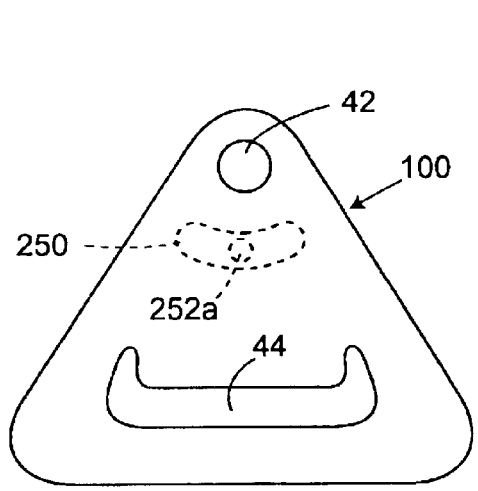
Figure 8D:
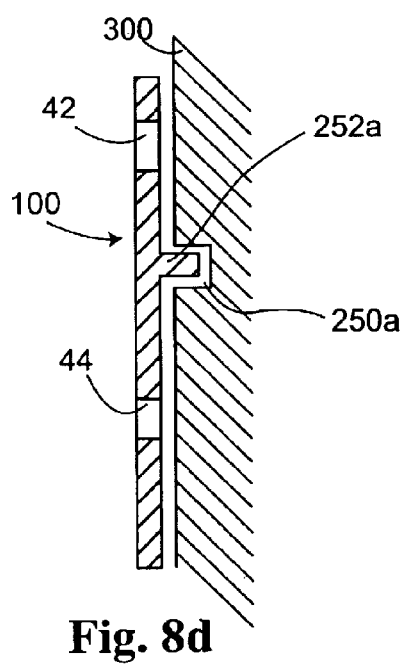

FIGS. 8c and 8d show another embodiment of the invention in which a pin 252a extends from the back of the web guide and is received within a slot 250a fabricated in an adjacent surface of the support member (seat frame, pillar, slide or frame of a height adjuster) 300. As before the pin and slot can be located between openings 42 and 44 or below opening 44.

Figure 9A:
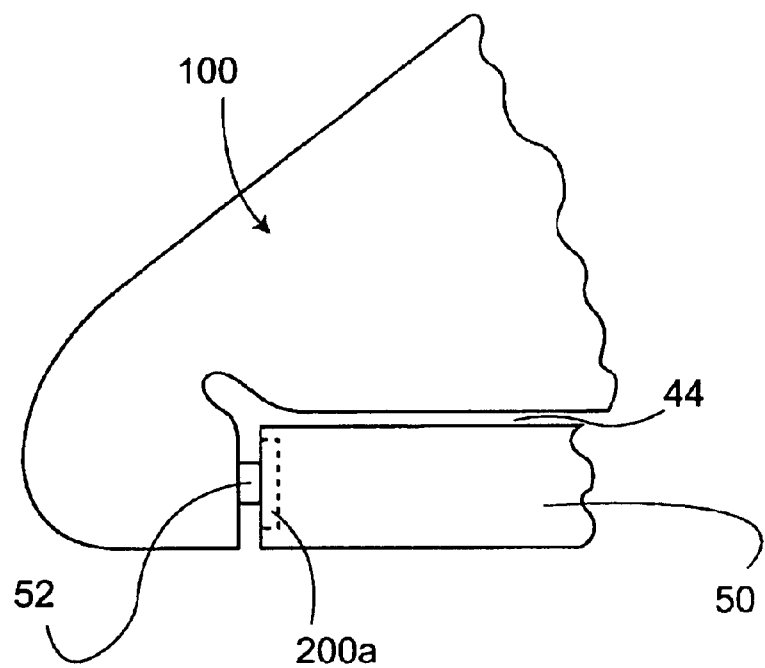
FIGS. 9a and 9b show an alternate embodiment of the invention.
Figure 9B:
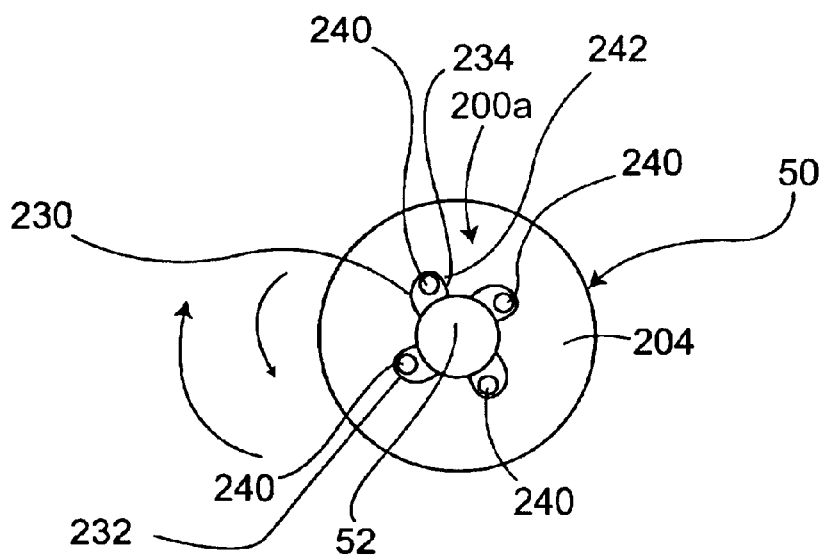

The web guide 100 of FIGS. 9a and 9b incorporates an alternate one-way roller mechanism 200a, which is incorporated within the roller 50. In this embodiment the roller includes a plurality of curved though tapered grooves 230 that are centrally located about the shaft 52 or alternatively a central bushing. Each groove 230 may include linear portion 232 and an arcuate portion 234, which curves toward the center that is toward the shaft 52 (or toward the center bushing) and forms a pocket 242, which receives a ball 240. The shape of the wall portions 232 and 234 are such that when the roller 50 rotates in a counterclockwise direction relative to shaft 52 (which in this embodiment is fixedly positioned), each ball 240 is urged into its respective pocket 242, in which case the roller 50 is free to rotate relative to the shaft 52. Rotation of the roller in a clockwise direction has the effect of moving each ball 240 toward the narrow end of the tapered groove 232, causing the balls to lock between the shaft and the body of the roller 50, thereby locking the roller and preventing it from rotating as the seat belt is protracted from the retractor in which case the seat belt will slide (rather than rotate) over the exterior support surface of the roller.

Figure 10A:
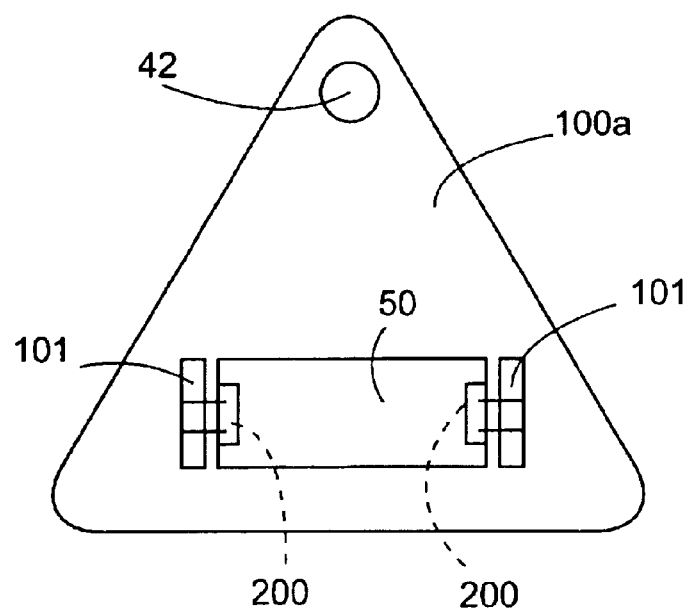
FIGS. 10a and 10b show an alternate embodiment of the invention.
Figure 10B:
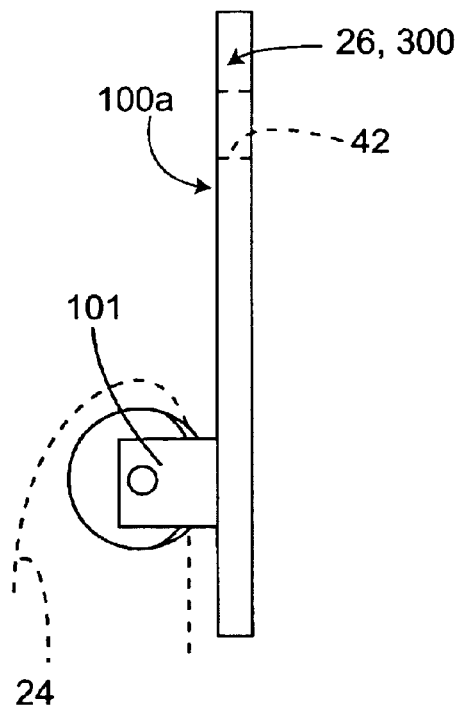

Reference is briefly made to FIGS. 10a and 10b, which show another embodiment. In this embodiment the webbing 24 does not extend through the web guide 26. Here the roller 50 is rotationally supported by opposing arms 101 and a corresponding shaft 52 or stub shafts. A one-way clutch 200 is incorporated within the roller or support plate such as the load bearing plate of the web guide. As can be appreciated, since the webbing is not required to pass through the support plate this embodiment can be realized in a number of ways. In one embodiment the support arms can be stamped from the load-bearing plate of the web guide. Alternately, the load-bearing function can be achieved from the support member such as the vehicle pillar or seat frame. In this case this type of support member (frame, pillar, height adjuster) is fabricated with the opposing arms 101 and the roller 50 and shaft 52 mounted thereto.

Many changes and modifications in the above-described embodiment of the invention can, of course, be carried out without departing from the scope thereof. For example the Accordingly, that scope is intended to be limited only by the scope of the appended claims.

What is claimed is:

1. A seat belt safety system comprising:
   a seat belt;
   a web guide including
      a load-bearing member;
      a cylindrical roller defined by a centroidal axis rotationally supported along the centroidal axis in relation to the load-bearing member and having a surface for supporting the seat belt;
      a one-way clutch for permitting the roller to rotate in a first direction and for prohibiting the roller from rotating in an opposite second direction, the roller and the one-way clutch configured to permit the seat belt and the roller to generally move together in the first direction while permitting the seat belt to slide over the roller when the roller is locked as the seat belt moves in the second direction.

2. The system as defined in claim 1 wherein an exterior seat belt support surface of the roller supporting the seat belt is crowned.

3. The system as defined in claim 1 wherein the load-bearing member includes an opening for receipt of the seat belt.

4. The system as defined in claim 3 wherein the roller is located within the opening.

5. The system as defined in claim 1 wherein the seat belt is between the roller and the load-bearing member.

6. The system as defined in claim 1 wherein the load-bearing member is mounted for rotation and the web guide additionally includes limiting means for limiting the rotation of the load-bearing member.

7. A seat belt safety system comprising:

a seat belt;

a web guide including a load-bearing member rotatably mounted relative to a first axis;

a roller having a centroidal axis, the roller rotatably supported along the axis by the load-bearing member so as to rotate in only one direction in response to friction forces imparted thereto by a seat belt which is supported on the roller; the roller configured to be rotatable in a first direction as the seat belt is retracting, the roller including rotation means for prohibiting the roller from rotating in a direction corresponding to seat belt protraction while permitting the seat belt to slide thereover.

8. The system as defined in claim 7 wherein the rotation means includes a one-way clutch.

9. The system as defined in claim 7 including limit means for limiting the extent to which the web guide rotates about the first axis.

10. A seat belt safety system comprising:

a seat belt;

a web guide comprising a load-bearing member rotatably mounted relative to a first axis;

a roller having an outer surface and an axis of rotation, the roller rotatably supported by the load-bearing member so as to rotate in only one direction about the axis of rotation, in response to friction forces imparted thereto by a seat belt which is supported on the roller, the roller configured so the outer surface moves generally uniformly about the axis of rotation, the roller configured to be rotatable in a first direction as the seat belt is retracting including rotation means for prohibiting the roller from rotating in a direction corresponding to seat belt protraction while permitting the seat belt to slide thereover.

11. The seat belt system according to claim 10 further comprising a one-way clutch coupled to the roller.

12. The seat belt system according to claim 10 wherein the roller is crowned.

13. A seat belt safety system including a web guide comprising:

a load-bearing member rotatably mounted relative to a first axis;

a roller having an outer surface and an axis of rotation, the roller rotatably supported by the load-bearing member so as to rotate in only one direction about the axis of rotation, in response to friction forces imparted thereto by a seat belt which is supported on the roller, the roller configured so the outer surface moves generally uniformly about the axis of rotation; the roller also including a one-way clutch stopping rotation in an opposite second direction;

wherein the roller defines a plurality of adjacent tapered slots.

14. The seat belt system according to claim 13 further comprising a spring biased pin configured to engage the tapered slots.

15. The seat belt system according to claim 14 wherein the tapered slots define a shoulder and wherein the spring biased pin engages the shoulder when the roller is rotated in a first direction so as to prevent rotation of the roller in the first direction.

16. The seat belt system according to claim 13 further comprising a plurality of spring biased pins, said pins being configured to ride up the taper of one slot onto a face of the roller and into an adjacent tapered slot when the roller rotates in a second direction.

* * * * *